US006954450B2

(12) United States Patent
Krischer et al.

(10) Patent No.: US 6,954,450 B2
(45) Date of Patent: *Oct. 11, 2005

(54) METHOD AND APPARATUS TO PROVIDE DATA STREAMING OVER A NETWORK CONNECTION IN A WIRELESS MAC PROCESSOR

(75) Inventors: Mark Krischer, Lane Cove (AU); Philip J. Ryan, Stanmore (AU); Michael J. Webb, Denistone West (AU)

(73) Assignee: Cisco Technology, Inc., San Jose, CA (US)

(*) Notice: Subject to any disclaimer, the term of this patent is extended or adjusted under 35 U.S.C. 154(b) by 14 days.

This patent is subject to a terminal disclaimer.

(21) Appl. No.: 10/724,559

(22) Filed: Nov. 26, 2003

(65) Prior Publication Data

US 2005/0111471 A1 May 26, 2005

(51) Int. Cl.[7] .................. H04Q 7/24; H04L 12/28; H04J 3/16
(52) U.S. Cl. .................. 370/338; 370/392; 370/466
(58) Field of Search .................. 370/338, 392, 370/466, 349, 389, 401, 467

(56) References Cited

U.S. PATENT DOCUMENTS

| | | | |
|---|---|---|---|
| 5,440,545 A | * | 8/1995 | Buchholz et al. ............ 370/426 |
| 5,491,802 A | | 2/1996 | Thompson et al. ..... 395/200.18 |
| 5,513,263 A | | 4/1996 | White et al. .................. 380/44 |
| 5,751,708 A | | 5/1998 | Eng et al. .................... 370/389 |
| 5,872,777 A | * | 2/1999 | Brailean et al. ............. 370/349 |
| 5,907,546 A | * | 5/1999 | Henriksson et al. ........ 370/349 |
| 6,253,271 B1 | | 6/2001 | Ram et al. ................... 710/128 |
| 6,263,374 B1 | | 7/2001 | Olnowich et al. ........... 709/253 |
| 6,298,071 B1 | * | 10/2001 | Taylor et al. ................ 370/486 |
| 6,404,772 B1 | * | 6/2002 | Beach et al. ................. 370/443 |
| 6,487,178 B1 | | 11/2002 | Romesburg et al. ........ 370/286 |
| RE37,980 E | | 2/2003 | Elkhoury et al. ............ 710/310 |
| 6,526,506 B1 | * | 2/2003 | Lewis ......................... 713/153 |
| 6,539,031 B1 | * | 3/2003 | Ngoc et al. .................. 370/470 |
| 6,694,134 B1 | | 2/2004 | Lu et al. ...................... 455/419 |
| 6,751,728 B1 | | 6/2004 | Gunter et al. ............... 713/153 |
| 6,842,446 B2 | * | 1/2005 | Everson et al. ............. 370/349 |
| 2003/0009624 A1 | | 1/2003 | Gruner et al. .............. 711/119 |
| 2003/0041163 A1 | | 2/2003 | Rhoades et al. ............ 709/232 |
| 2003/0065832 A1 | | 4/2003 | Emerson et al. ............. 710/23 |

OTHER PUBLICATIONS

J. Stokes. "Understanding Bandwidth and Latency." Downloaded May 22, 2003 from Ars Technica. URL: http://www.arstechnica.com/paedia/b/bandwidth–latency/bandwidth–latency–1.html.

"SOC–it." 2002. MIPS Technologies, Mountain View, CA. URL: http://www.mips.com/ProductCatalog/P_SOC–it/SOC–it.pdf.

A. Mendelsohn. "FPGA–Based I/O Board Offloads Windows PC's." Product of the Week on Chipcenter.com, May 22, 2003.

* cited by examiner

Primary Examiner—Andy Lee
(74) Attorney, Agent, or Firm—Dov Rosenfeld; Inventek

(57) ABSTRACT

A method of wirelessly transmitting or receiving a packet of information, and an apparatus to wirelessly transmit or receive a packet of information. In the case of transmitting, the method includes streaming a data element, including at least some of the contents of the packet, over a network link during transmit time. In the case of receiving, the method includes streaming a data element, including at least some of the contents of the received packet, over a network link during receive time. The transmitting or receiving is by a station of a wireless network and the streaming is to or from the station from or to a network device coupled to the station by the network link.

43 Claims, 4 Drawing Sheets

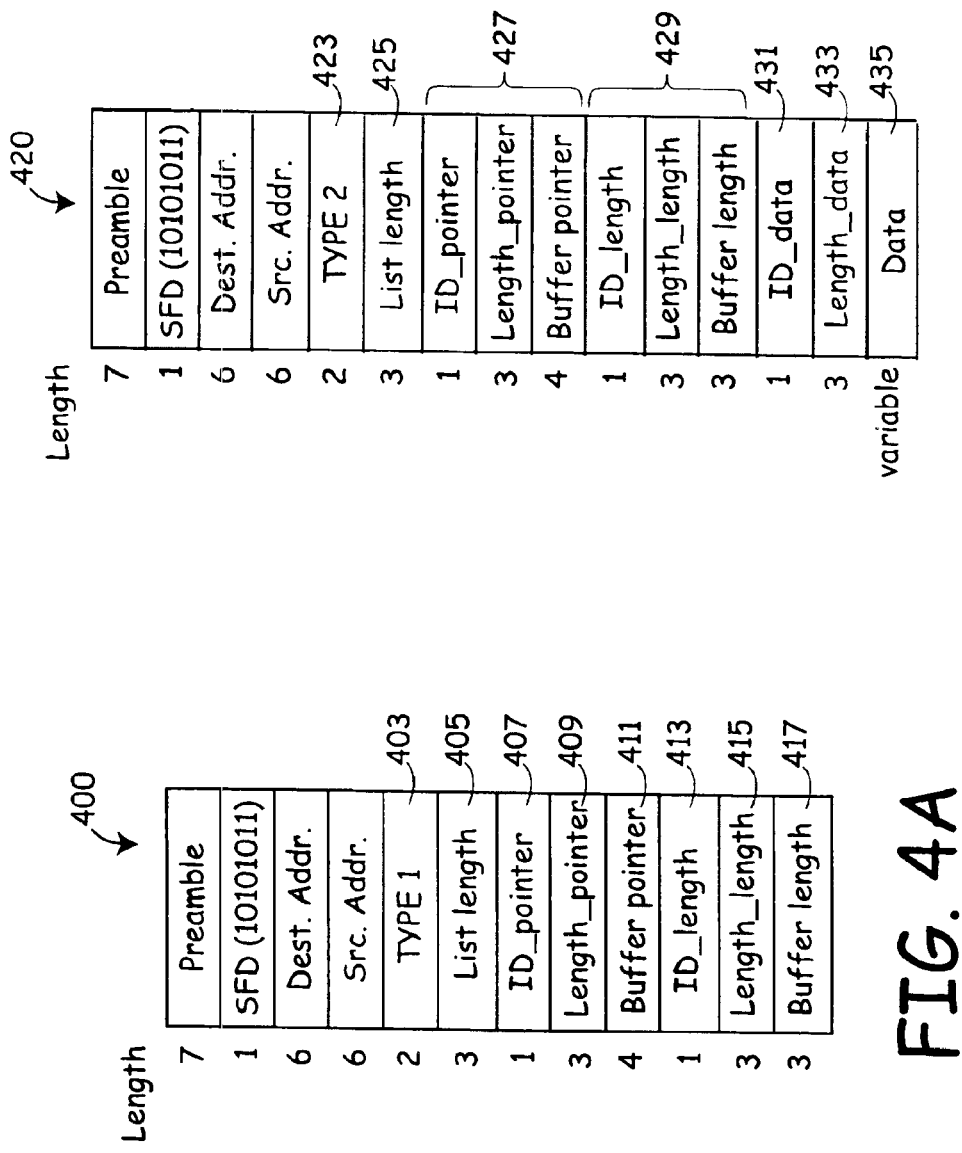

METHOD AND APPARATUS TO PROVIDE DATA STREAMING OVER A NETWORK CONNECTION IN A WIRELESS MAC PROCESSOR

BACKGROUND

This invention is related to wireless networks, and in particular to a MAC controller and method for MAC processing that obtains data for wireless transmission directly from memory across a packet network link.

FIG. 1 shows a traditional prior-art wireless network connection 100, e.g., for a wireless local area network (WLAN) that conforms to one of the IEEE 802.11 standards. The radio part 101 includes one or more antennas 103 that are coupled to a radio transceiver 105 including an analog RF part and a digital modem. The digital modem of radio 101 is coupled to a MAC processor 107 that implements the MAC protocol. The MAC processor 107 is connected via one or more busses, shown symbolically as a single bus subsystem 111, to a host processor. The host processor includes a memory, e.g., RAM connected to the host bus, shown here as part of the bus subsystem 111.

In implementing the MAC protocol, e.g., the IEEE 802.11 MAC protocol, the MAC processor 107 decides which MAC packets to transmit at what time. A typical prior art MAC processor 107 includes a fast but relatively small local memory, shown as MAC memory 109 in FIG. 1 that makes sure the MAC processor has fast access to the packets it needs to transmit. The host processor decides which MAC packets the MAC processor is likely to need, and sends such packets to be included in the local MAC memory 109. When there are one or more packets to transmit, the MAC processor then takes such packets from its MAC memory 109.

One problem that can occur is when the local MAC memory does not contain the packet the MAC processor 107 needs to transmit. The transmission is then slowed down while the MAC processor obtains the required packet from the host memory 115 via the bus subsystem 111 and loads it into its local MAC memory 109.

It is desired to reduce the problems that occur with such misses, or even to eliminate the need for the local MAC memory to hold the packets for transmission so that such misses are less likely.

There recently has been a move to move more and more of the MAC processing functions to the host processor. The host, for example, may implement a WLAN access point. By moving more and more of the functionality to software on the host, more flexibility is achieved. Such an arrangement can also help eliminate the misses described above of the MAC processing not having the required packets in its local MAC memory 109.

In one such arrangement, the MAC processing functions are divided between a "Lower MAC" that implements in hardware such aspects as interfacing to the physical radio (the PHY) 101, encryption, and the actual receiving and sending of MAC packets. The Lower MAC may be implemented using a processor and includes a local memory. The "Higher MAC" functions, i.e., the remaining MAC functions are implemented in software running on a host processor. The Lower MAC is coupled to the host processor via a bus subsystem.

When to-be-transmitted packets are ready, the host passes information to the Lower MAC on such packets. The information, for example, may include information on where the payload for the MAC packets resides in the host memory. This information is stored locally on the Lower MAC. When the Lower MAC is set up to transmit the to-be-transmitted MAC packets, the Lower MAC sets up a DMA transfer of the required data. The data is then passed to the Lower MAC processor via DMA from the host.

This avoids the miss situation of the prior-art method that includes the host predicting and pre-loading the local MAC memory with to-be-transmitted packets.

There has recently been a desire to move more of the intelligence of a station used as an access point to the switch. For example, it may be that some of the MAC functionality will be carried out in a switch to which the access point is connected.

There is thus a need in the art for a mechanism that provides for more of the MAC functionality to reside in a device remote from the wireless station itself.

SUMMARY

Disclosed herein are a method of wirelessly transmitting or receiving a packet of information, and an apparatus to wirelessly transmit or receive a packet of information. In the case of transmitting, the method includes streaming a data element, including at least some of the contents of the packet, over a network link during transmit time. In the case of receiving, the method includes streaming a data element, including at least some of the contents of the received packet, over a network link during receive time. The transmitting or receiving is by a station of a wireless network and the streaming is to or from the station from or to a network device coupled to the station by the network link.

One embodiment is a method implemented in a station of a wireless network—in one embodiment, an IEEE 802.11 wireless network. The station is coupled to a network device, in one embodiment, a switch, by a network link—in one embodiment, a Gigabit Ethernet or any Ethernet at least as fast as a Gigabit Ethernet. The network device includes a memory. The method is of streaming data over the network link from or to the network device memory during wirelessly transmitting or wirelessly receiving at the station.

The method includes accepting information describing wherefrom to retrieve a data element including at least some of the data for a to-be-wirelessly-transmitted packet in the case of transmitting, or whereto write a data element including at least some of the data from a wirelessly received packet in the case of receiving. The accepted information includes information defining a memory location and an amount data in the network device memory for the data element.

The method further includes setting up a DMA transfer of the data element for the to-be-wirelessly-transmitted packet in the case of transmitting, or from the wirelessly received packet in the case of receiving, the setting up using the defining information.

In the case of transmitting, the method also includes converting the defining information to a packet of a first type for transport over the network link, and sending the packet of the first type via the network link to the network device to be interpreted at the network device to set up sending the data element from or writing the data element to the memory of the network device according to the defining information.

Also in the case of transmitting, the method includes receiving, in response to the sending of the packet, a packet of a second type that includes the data element, converting the packet of the second type to the data element, and incorporating the data element into the packet for transmission, such that the transfer over the network occurs in real time during transmit time.

In the case of receiving, the method includes extracting the data element from the wirelessly received packet, encapsulating the data element into a packet of the second type to be written into the memory of the network device, and sending the packet of a second type to the network device to be interpreted at the network device to cause the encapsulated data to be written into the memory of the network device according to the defining information.

According to the method, in the case of transmitting, the transfer over the network of the data element for incorporation into a packet for wireless transmission occurs in real time during transmit time, or, in the case of receiving, the transfer over the network occurs in real time during receive time.

Another embodiment is a method implemented in a network device—in one embodiment, a network switch. The network device is coupled via a network link, e.g., a fast enough Ethernet link such as a Gigabit or faster Ethernet to a station of a wireless network—in one embodiment, an IEEE 802.11 wireless network. The network device includes a memory. The method is of streaming data over the network link from or to the network device memory during wirelessly transmitting or wirelessly receiving at the station.

The method includes sending information over the network link to the wireless station describing wherefrom to retrieve a data element including at least some of the data for a to-be-wirelessly-transmitted packet in the case of transmitting, or whereto write a data element including at least some of the data from a wirelessly received packet in the case of receiving. The accepted information including information defining a memory location and an amount data in the network device memory for the data element. The method further includes receiving a packet of the first type from the wireless station via the network link. The packet includes the information describing wherefrom to retrieve or whereto write the data element.

In the case of data for a to-be-transmitted packet, the method includes, in response to the receiving of the packet of the first type, retrieving the data element from the memory, forming a packet of a second type that includes the retrieved data; and sending the packet of a second type to the wireless station in response to the receiving of the packet of the first type, such that the transfer of data over the network for incorporation into a packet for wireless transmission occurs in real time during transmit time.

In the case of data from a received packet, the method includes receiving a packet of a second type from the wireless station encapsulating the data element, extracting the encapsulated data from the packet of the second type, and writing the extracted data into the memory according to information in the received packet of the first kind, such that the transfer of data over the network from a wirelessly received packet occurs in real time during receive time.

Other aspects will be clear from the description herein.

BRIEF DESCRIPTION OF THE DRAWINGS

FIGS. 4A and 4B respectively show an Ethernet packet of the first and second special types, according to an aspect of the present invention.

DETAILED DESCRIPTION

An aspects of the present invention provides a method and an apparatus that allows data elements for a packet for wireless transmission by a wireless station to be streamed over a network link from a network device remote from a wireless station during transmit time. By remote from a wireless station is meant that the wireless station is connected to the remote device via a packet-network link, such as an Ethernet link. Another aspect of the present invention provides a method and an apparatus that allows data elements from a wirelessly received packet to be streamed to the remote network device over the network link during receive time such that the data from the received packets can be stored in real time in the remote network device.

Embodiments of the invention will be described in terms of the wireless station being an access point (AP) in a wireless local area network (WLAN). In one embodiment, the remote network device is a network switch coupled by a network link to the wireless access point.

On-the-Flight Data Streaming to and from Host Memory

Figure 1:
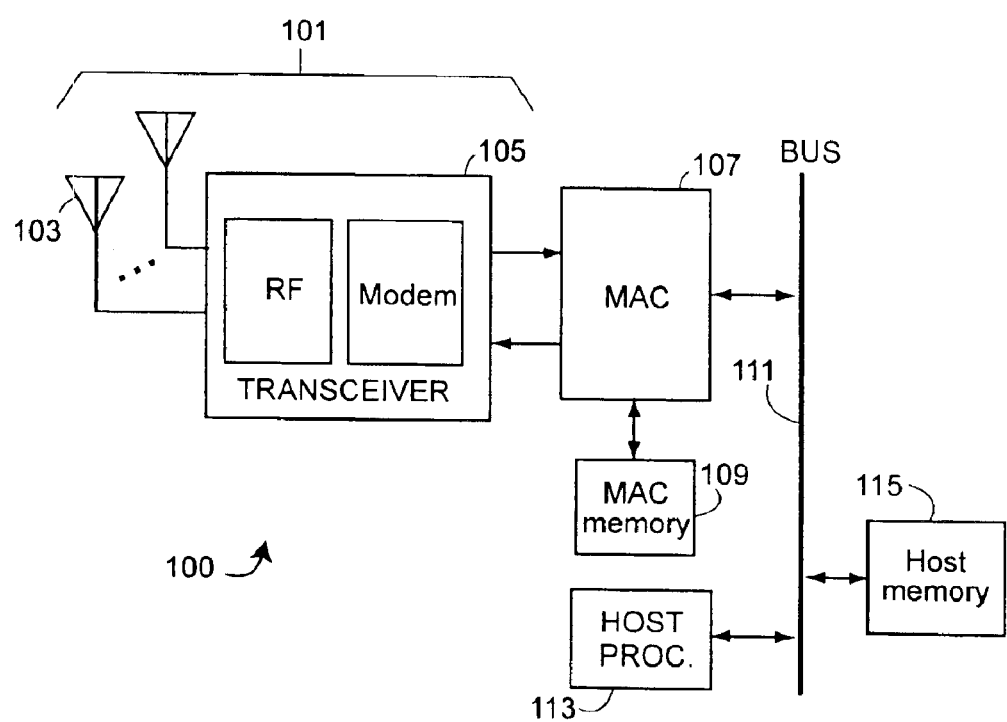
FIG. 1 shows a prior-art wireless network connection for a wireless local area network (WLAN).
Figure 2:
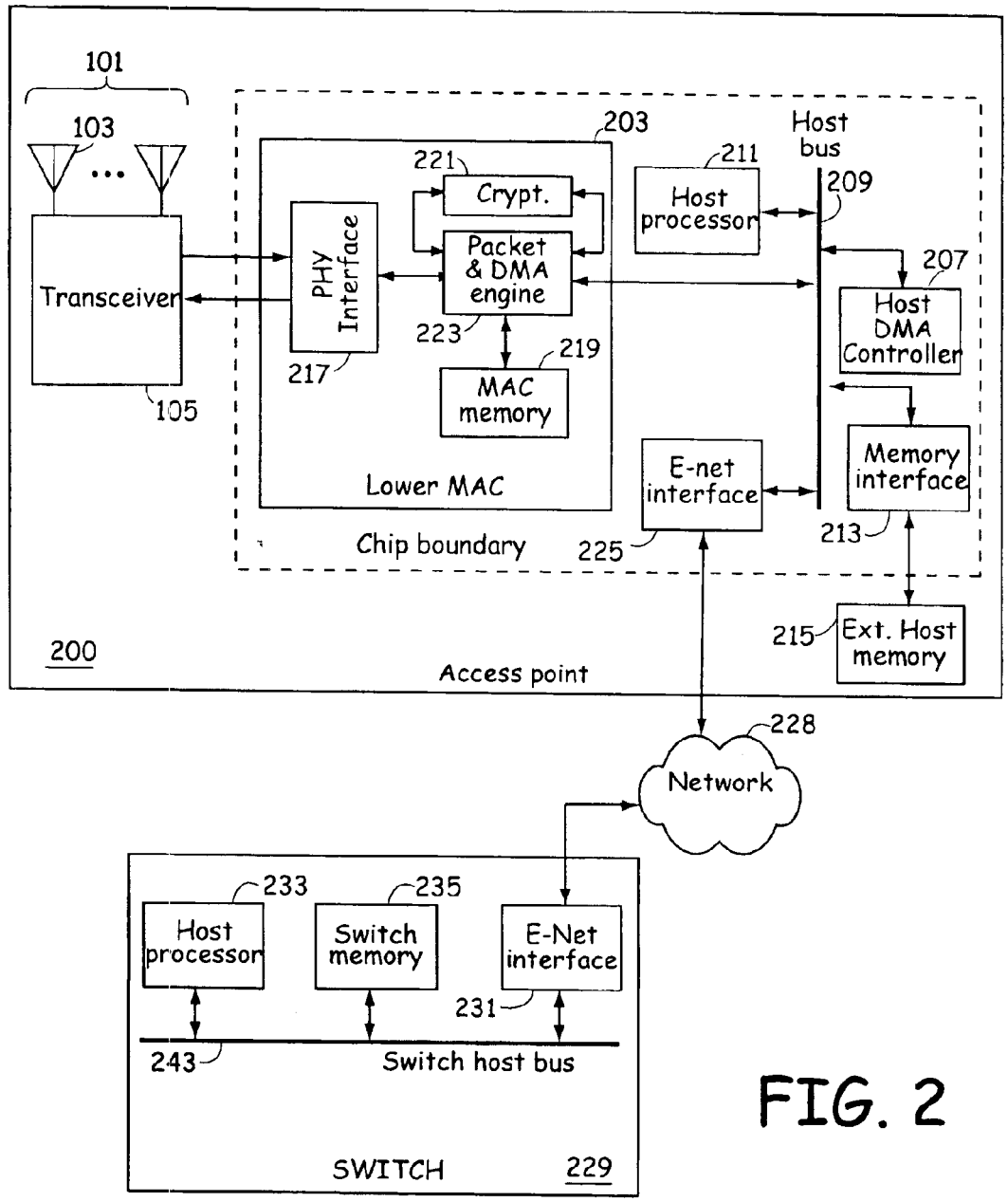
FIG. 2 shows an embodiment of a wireless station for implementing an access point (AP).

FIG. 2 shows a wireless station for implementing an access point (AP) coupled to a network switch 229 via a network link 228, typically a wired network connection such as an Ethernet connection. The MAC processing functions of the station 200 are divided between a "Lower MAC" 203 that implements such aspects as interfacing to the physical radio (the PHY) 101 using a PHY interface 217, encryption/decryption using a cryptography engine 221, and the actual receiving and sending of MAC packets in a MAC packet and DMA engine 223. The "Higher MAC" functions, i.e., the remaining MAC functions are implemented in software running on a host processor 211. The Lower MAC 203 is coupled to a host processor 211 via a bus subsystem 209. Coupled to the host bus are also a host DMA controller 207 and a host memory interface 213 to which host memory 215 is connected.

In the example in which the station is an access point, the station 200 includes a network interface 225 such as an Ethernet interface connected to the host bus 209. The network interface connects the station 200 to a network 228, e.g., an Ethernet. A switch 229 is shown connected to the network. The switch 229 itself includes a local switch host processor 233 and a switch memory 235 connected via a local switch bus subsystem 243. The switch, for example, may operate under a network operating system such as IOS (Cisco Systems, Inc, San Jose, Calif.). A network interface, e.g., an Ethernet interface 231 connects the switch bus to the network 228.

Suppose by way of example, that the Lower MAC and the host processor are implemented on the same integrated circuit (chip) that includes the memory interface 213. The memory 215 is external memory to the chip.

Various details are not shown in FIG. 2. For example, there may be some cache memory and other internal memory to the host other than the external memory shown.

During transmission, in order to avoid the disadvantages of the MAC processor using its local MAC memory 219 as a memory buffer for packets to be transmitted, an improved implementation uses streaming direct memory access (DMA)—also called "data streaming"—across the bus subsystem and memory interface to directly access data for transmission from the host memory 215 without involving the host processor 211. To provide for this, the packet/DMA engine 223 includes a scatter/gather DMA controller for setting up DMA transfers.

Consider as an example the host processor receiving packets via the network 228 that are for wireless transmission. When the host processor has new packets ready for transmission, it informs the Lower MAC 203 by providing the Lower MAC with information sufficient to set-up the transmission. This information includes the MAC headers for the packets for transmission, the location of any data required for building a MAC packet, and information on how to construct the MAC packet from the data. In one embodiment, the information provided to the Lower MAC 203 by the host includes a set of data structures—called "buffer descriptors" herein—that include where the data for the MAC packets is located, e.g., in the host memory 215.

The Lower MAC 203 extracts and stores locally in its MAC memory 219 the headers of the packets for transmission. The buffer descriptors for each MAC packet are also stored with the MAC packet's MAC header locally in the MAC memory 219. Once the headers are in the local MAC memory 219, the Lower MAC 203 assumes control of those packets for transmission.

Each buffer descriptor data structure includes fields defining a contiguous amount of memory, and includes an address pointer field and a data length field. The content of the address pointer field points to a location in memory and the data length field provides the amount (the length) of data starting at the address pointed to by the pointer. A complete MAC packet includes a plurality of such buffer descriptors, called a "buffer descriptor chain" herein, that together describe where the data for the to-be-transmitted MAC packet resides. That is, a set of buffer descriptors, each defining a contiguous amount of data, together define a not-necessarily-contiguous set of data for forming the MAC packet for transmission.

Note that there similarly is also defined a receive buffer descriptor chain of receive buffer descriptors that describes where a the data of packet that is received is to be stored.

The station 200 has a memory map that defines where each address resides, e.g., in the local MAC memory or on the host memory 215.

The scatter/gather DMA controller of packet/DMA engine 223 is used set up DMA data transfers of data that is written to or read from not-necessarily-contiguous areas of memory. A scatter/gather list is a list of vectors, each of which gives the location and length of one segment in the overall read or write request. Thus, each buffer descriptor chain for a MAC packet for transmission includes information sufficient for the packet/DMA engine 223 to build a scatter/gather list. The packet/DMA engine 223 interprets the buffer descriptor chain to form a scatter/gather list. The packet/DMA engine 223 is also responsible for following the transmission schedule, and transmitting MAC packets via the PHY interface according to the schedule.

When a MAC packet needs to be transmitted, the packet/DMA engine 223 sets up a scatter/gather list from the buffer descriptor chain. Each vector corresponds to a buffer descriptor and describes the blocks of memory defined the buffer descriptor. The packet/DMA engine 223 is in communication with the host DMA controller and sets up the transfers with the host DMA controller according to the transmitting schedule.

Once set-up, the transfer occurs from the host memory and/or local MAC memory to form the MAC packets for transmission in real time.

Consider a single transfer of a contiguous amount of memory as described in a single buffer descriptor. The packet/DMA engine 223 communicates the DMA information the vector via the host bus 209 to the host DMA controller 207. The host DMA controller is in communication with the memory interface 213 and retrieves the data and transmits the data via the bus to the packet/DMA engine 223.

For transmission, the data may pass through the cryptography engine as required and then via the PHY interface for transmission via the transmit part of the PHY 101.

In this manner, the miss situation of the prior-art method that includes the host predicting and pre-loading the local MAC memory with to-be-transmitted packets is avoided.

When receiving data, the process is basically reversed. In an information exchange, the lower MAC receives from the host processor 211 the addresses where packets that are received in may be stored. In particular, the Lower MAC 203 maintains a set of receive buffer descriptor chains for receiving packets. A receive buffer descriptor chain includes receive buffer descriptors that indicate where in the host memory 215 the data for received packets may be stored. When data is received via the PHY interface 217, the packet/DMA engine 223 sets us the data transfer, including possibly passing through the cryptography engine 221 for decryption. The DMA engine in the packet/DMA engine sets up the required scatter/gather list for DMA transfers and communicates this information to the Host DMA controller. The host DMA controller has access to a memory map that indicates where in memory, e.g., on the host memory 215, the data is to be written, and sets up the each DMA transfer to host memory.

Streaming Over the Wired Network

There is a general desire in the art to move more of the functionality of the wireless station to a network device, e.g., to the network switch 229 coupled to the station via a network link.

The system shown in FIG. 2 requires the data for to-be-transmitted packets to be queued at the station, e.g., in host memory 215, and to be available for transmission in the host memory 215.

An aspect of the present invention includes on-the-fly data streaming over a network link that provides for data for inclusion in a packet for wireless transmission to be streamed directly from a network switch during transmit time without necessarily requiring queuing in the transmitting wireless station. Another aspect of the invention provides for received data to be streamed directly to a network switch during receive time without requiring queuing in the receiving wireless station.

Figure 3:
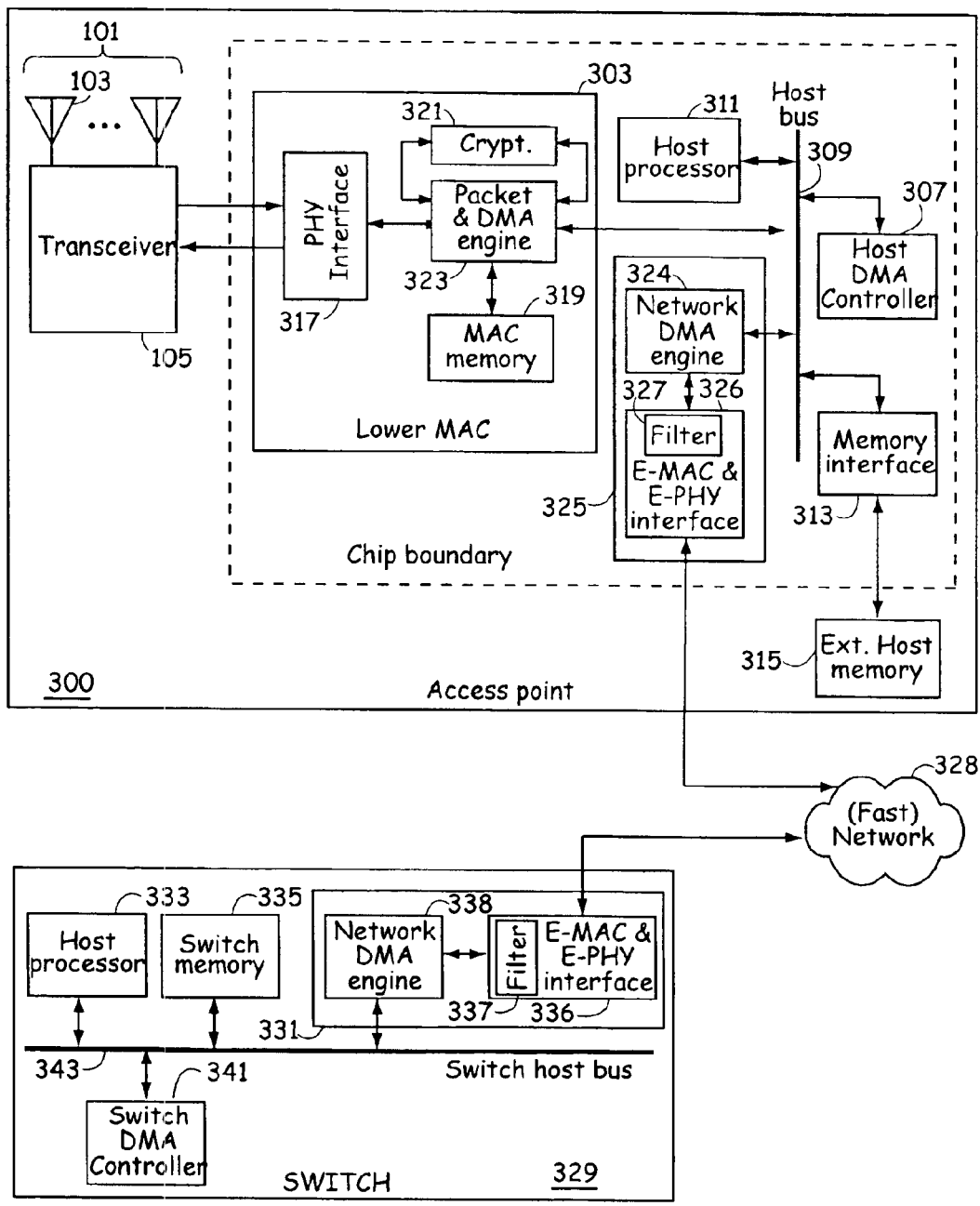
FIG. 3 shows an embodiment of a wireless station for implementing an access point (AP), including a network link to an access point.

FIG. 3 shows an apparatus that embodies aspects of the present invention. The general architecture is similar to that shown in FIG. 2, except that some of the functionality of the host processor is transferred to a network device, e.g., a network switch that is coupled to the wireless station via a wired network. That is, a wireless station 300 includes a lower MAC 303 that in turn includes a packet/DMA engine 232, an encryption engine 321, and a local MAC memory 319. The station 300 also includes a host processor on a host bus subsystem 309. A memory interface 319, and a host DMA controller 307 are connected to the host bus 309. The lower MAC is coupled to the host bus 309, in one embodiment via the packet/DMA engine 323.

The station 300 is coupled to a network switch 329 via a network link 328 that is coupled to the host bus subsystem 309 via a network interface 325 coupled to the host bus 309.

The switch 329 includes a local switch bus subsystem 343 that connects a switch host processor 333 with a switch memory 335. In one embodiment, the switch further includes a switch DMA controller 341 coupled to the switch bus 343 and able to cause DMA transfers with the local switch memory 335. A network interface 331 connects the switch to the network 328.

In one embodiment, the host 333 of the switch 329 runs on a network operating system: IOS (Cisco Systems, Inc., San Jose, Calif.).

Note that even though the architecture of the station 200 of FIG. 2 and that of FIG. 3 is similar, the functionality however is different in that some of the higher MAC functions are now carried out in a network switch 329. Thus, different reference numerals are used in FIGS. 2 and 3 for all elements other than the PHY 101. Some of the elements, however, may be identical, as would be clear to those in the art.

One aspect of the invention is that at least some of the data of MAC packets that are for wireless transmission are streamed during transmit time across the network link 328 from the switch memory to the lower MAC 303 for transmission by the PHY 101 such that data does not need to be queued in the host memory. Another aspect is that data received by the PHY 101 may be directly streamed to the switch during receive time across the network link 328 such that received data need not be queued in the host memory. The inventors recognize that wired networks are becoming sufficiently fast to provide such streaming. In the preferred embodiment, the network 328 is a Gigabit Ethernet network. Of course, that means any Ethernet network link at least as fast as an Ethernet network link may be substituted and is within the scope of the term "Gigabit Ethernet" for purposes the invention.

In order to provide the streaming feature, one embodiment of the invention includes network DMA engine 324 in the station, and the matching network DMA engine 338 in the switch. In the case of the station 300, the network interface 325 includes a network MAC and PHY interface 326 and the network DMA engine 324. On the bus side, the network DMA engine 324 appears as a memory interface. The host DMA controller 307 is in communication with the network DMA engine 324 as if it was a memory interface device and further is in communication with the memory interface 313. A memory map in the access point indicates which memory addresses are handled by the memory interface 313 and which are handled by the network DMA engine 324.

In the switch, the network interface 331 includes a network DMA engine 338 and a network MAC and PHY interface 336. On the switch bus side, the network DMA engine 338 appears as a memory controller. A switch memory map indicates which addresses are in the local switch memory 335, and which are handled by the network DMA engine 338.

In the case of transmission, when the host DMA controller 307 receives a memory request, e.g., set up by the packet/DMA engine 323 of the lower MAC, it communicates with either the network DMA engine 324 or the memory interface 313 according to the address. Normally, the packet/DMA engine 323 sets up DMA transfers via the network DMA engine 324. The DMA controller 307 need not be aware that any data requested from the network DMA engine 324 actually comes from across a network link.

Note that while in one embodiment, the address indicates to the DMA controller 307 whether a DMA transfer is to or from the DMA engine 324 or the memory interface 313, in an alternate embodiment, a separate indication, e.g., a control bit is used to indicate whether a DMA transfer is to or from the DMA engine 324 or the memory interface 313.

Similarly, the switch DMA controller 341 treats the switch network DMA engine 338 as if it is a memory interface device, and need not be aware that any data transfer travels across the network link 328.

Another aspect of the invention is the process carried out by the network DMA engines 324 and 338 of the station host and switch, respectively. Yet another aspect of the invention is defining network packet types that are used for setting up the network streaming, and for carrying data during such streaming. Yet another aspect of the invention is the receive filtering carried our by filters 327 and 337, respectively, of the network MAC and PHY interfaces 326 and 336 of the station host and switch, respectively.

These aspects will first be described in the context of a set of packets that are for wireless transmission by the wireless station 300.

Consider first the operation during transmit of the embodiment shown in FIG. 2. In this case, the switch 229 routes any packets that are for transmission by the wireless station 200 to the wireless station. Such packets are queued in the host processing system, e.g., in the host memory 2315, and the host communicates with the lower MAC 203 to set up DMA transfers of data in the host memory, as required, e.g., by communicating the packet headers and the set of buffer descriptors (the buffer descriptor chain) for each packet.

By contrast, in one embodiment of the present invention, when the switch 329 has packets that are for transmission by the wireless station 300, the switch 329 sends the information on the packets for transmission, e.g., the header information and the buffer descriptor chain for each to-be-transmitted packet to the station via the network 328. Such information is communicated to the lower via the host bus 309. The host plays little role in this.

In an alternate embodiment of the invention, the host receives information on where at least some of the data for a packet for transmission exists in the switch, and the host is involved in the setting up of the buffer descriptor chain using such data sent by the switch. However, the data itself remains in the switch until streamed for transmission. For example, the host interprets information sent from the switch as information for the lower MAC on packets for transmission and passes this information to the lower MAC.

When the lower MAC 303 receives the header information and the descriptor chain for the packets for transmission, the lower MAC stores the headers and the associated information in its local MAC memory 319 and schedules the transmission. At the start of transmit time, the MAC packet/DMA engine 323 sets up for scatter/gather DMA access of data needed to build each packet. The MAC packet/DMA engine 323 sends each request in the scatter/gather to the host DMA controller 307. These requests are interpreted by the DMA controller 307 and communicated to the memory interface 313 or Network DMA engine 324 depending on the address. Thus, the host DMA controller 307 treats network DMA engine 324 as a memory interface for a pre-defined range of addresses that are outside the address range of the host memory 313.

For each memory request, the Network DMA engine 324 sets up the network transfer by setting up packets of a first special type that are control packets that describe up the memory request in the form of the required memory transfer from the memory of the switch. The special packets include pointer data pointing to a location in the switch memory, and length information. These special-type packets are transmitted to the switch via the network 328.

The network MAC and PHY interface 336 interprets all packets it receives. In one embodiment, the network MAC and PHY interface 336 includes a filter 337 that indicates to the network DMA engine 338 information from special-type packets it receives for further processing by the network DMA controller 338. The non-special-type packets are processed normally and passed on.

The network DMA engine interprets the information from special-type packets to translate the control information and communicate information to the switch DMA controller 341 to set up DMA transfer from the switch memory 335 according to the information in the control packets. The DMA transfer is set up to destination addresses that are understood by the switch 329 to be addresses handled by the network DMA controller 338. The network DMA controller 338 appears to the switch DMA controller 338 as a memory interface.

The data that is aimed at the Lower MAC 303 are encapsulated by the network DMA engine 338 of the switch as packets of a second special type: streaming data encapsulating packets. Each streaming data encapsulating packet includes the original pointer and length data element of the corresponding request packet and is sent to the access point 300 via the network 328 and received via the Network MAC and PHY interface 326.

The Network MAC and PHY interface 326 includes a filter 327 that indicates to the network DMA engine 324 those packets that are to be processed by the network DMA controller 324, i.e., the second special-type packets. Non-special-type packets are processed normally by the Network MAC and PHY interface.

The network DMA engine 324 interprets the information in the second special-type packets, i.e., in the streaming data encapsulating packets. One aspect is that the pointer and length information in the second-type-special packets is used to match the packet as a response to a DMA request. The network DMA engine 324 removes the data and communicates them via the bus 309 as responses to the matching DMA requests. To the host system bus, these appear as regular DMA responses transfers set up by the host DMA controller 307, since for such transfers, the network DMA engine 324 is set up as if it was a memory interface.

The DMA controller 307 routes the fetched data to the requesting packet/DMA engine of the Lower MAC, just as it would for any DMA request.

FIGS. 4A and 4B show the structures of the two special types of packets. These are standard IEEE 802.3 frames that include TYPE fields whose respective contents are two unique previously undefined values, used to define the packet of the first type and second type, respectively.

FIG. 4A shows a packet 400 of the first kind. The preamble, start of frame delimiter, destination address, and source address fields are standard. For example, the source address is of the station 300, and the destination address is of the switch 329. The next field 403 is used as a TYPE field and includes a code, denoted TYPE-1, for a new type. Any previously unused value that is large enough such that it defines a type, and that is not used for other purposes, may be used here. The remaining part of the packet 400 provides the pointer and length information for the data transfer. This is done using a standard information element list structure that starts with a List length field 405 that indicates the length of the list, and then a set of type/length/value triplets for each element, in this case, the pointer element and the length element. Thus, following the List length field 405 is a field 407 carrying an identifier, denoted ID_pointer that identifies the element as the pointer, then a field 409 denoted Length_pointer indicating the length of the pointer data. The next field 411 is the pointer data itself, i.e., the address in the switch memory from where to fetch the data. Following the pointer data field 411 is a field 413 carrying an identifier, denoted ID_length that identifies the element as the length of the data to fetch, then a field 415 denoted Length_length indicating the length of the length information. The next field 417 is the length information itself, i.e., the length of the data to fetch from the switch memory.

Note that the inventors decided to use packets that include a flexible information element list structure in order to provide for flexibility in how these packets are used in the future. In an alternate embodiment, simpler fixed length packets are used that include, e.g., only the buffer pointer and the buffer length information following the TYPE field 403.

FIG. 4B shows a packet 420 of the second kind that the network DMA engine 338 sets up for sending data defined in the control packet 400 of the first kind. The preamble, start of frame delimiter, destination address, and source address fields are again standard. For example, the source address is of the switch 329, and the destination address is of the station 300. The next field 423 is used as a TYPE field and includes a code, denoted TYPE-2, for another new type different than that used in the control packet 400. Any previously unused value that is large enough such that it defines a type, and that is not used for other purposes, may be used here. The remaining part of the packet 420 provides the pointer and length information for the data transfer. A List length field 425 indicates the length of the list, which in the case of this packet 420, depends on the amount of data being sent. Following the List length field 425 is a set of type/length/value triplets for each element, in this case, the pointer element, the length element, and the data being transferred. The type/length/value triplets 427 and 429 for the pointer and the lengths, respectively, are the same as in the corresponding control packet 400 that requested the data included. Following is a field 431 carrying an identifier, denoted ID_data that identifies the element as the data being transferred, then a field 433 denoted Length_data indicating the length of the data. The next field 435 is the data from the switch memory that is being transferred.

Note that the above description corresponds to these packets being used for a memory fetch set up by the host DMA controller 307.

The same special-type packets—just one of them in one embodiment—may be used for a DMA data write that is set up in the case of the station 300 receiving data.

In the case of receiving, the switch 329 sends information and the station 300 accepts information describing where in the switch memory 335 to write data elements of wirelessly received packets, e.g., received buffer descriptor chains of received buffer descriptors for received packets. Each received buffer descriptor defines a switch memory location and an amount data in the switch memory for a data element.

The received buffer descriptor chains are stored in the Lower MAC memory 319.

When a packet is received, the packet/DMA engine 323 sets up scatter/gather DMA transfer of the data elements from the wirelessly received packet. The information for the DMA transfer is communicated to the host DMA controller 307 that sets up the individual data element transfers. The actual data transfer occurs as a data stream during receive time and includes the extraction of the data element from the wirelessly received packet, and according to the requirement, passing the data through the encryption engine by the packet and DMA engine, and then the transfer via the host bus as a DMA transfer to the network DMA engine 324 (recall, this appears as a memory interface to the host bus and DMA controller).

Consider the transfer of a single block of data to be written into contiguous block of memory addresses in the switch memory 335. From the pointer address in the DMA request, the host DMA controller 307 ascertains that the address is for the network DMA engine 324 that appears to the DMA controller 307 as a memory interface for a range of addresses.

The DMA request from the host DMA controller 307 is translated by the network DMA engine 324 to a packet of the second special type that includes the pointer and length data for the transfer, and the data element of the transfer to be written into the switch memory. The packet of the second type is sent to the switch 329 via the network via the Ethernet MAC and PHY interface and the network link 328.

At the switch, the packet of the second type is received by the Ethernet MAC and PHY interface 336 that includes a filter 337 that filters out the packet of the second type and passes the information therein, including the data, to the network DMA engine 338. The network DMA engine 338 interprets the request and sets up for, and writes the data to the memory location in the switch memory 335.

Thus, the streaming of data over the network from a wireless station to the switch memory occurs in real time during receive time.

Note that while in the embodiment shown, the network DMA engines 324 and 338 in the switch and wireless station, respectively, that interpret the special packets and convert them to memory stream requests are each shown as part of the packet engines of network controllers, in alternate embodiments, these aspects are carries out a separate device in each of the switch and wireless station.

While today's processors are such that the network DMA engines 324 and 338 are likely to be in special hardware, the inventors recognize that programmable processors in the future may be fast enough to implement such a network DMA engine. Thus, the network DMA function may be implemented in hardware, in software (including firmware) as one or more code segments that execute on a programmable processor, or in a combination of hardware and software.

Similarly, while in one embodiment, the packet/DMA engine 323 is implemented in hardware, the inventors recognize that programmable processors in the future may be fast enough to implement such some or all of the functionality of the packet/DMA engine 323. Thus, the packet/DMA engine function may be implemented in hardware, in software (including firmware) as one or more machine readable code segments that execute on a programmable processor, or in a combination of hardware and software.

FIG. 3 shows the chip boundary for the access point chip that includes the lower Mac and the MAC host. In one embodiment, host processor 311 is a MIPS 5K processor core and the host bus is a "SOC-it" bus (both MIPS Technologies, Inc. Mountain View, Calif.).

During transmit time means during the time the packet that includes the data being streamed is being transmitted. For example, "during transmit time" excludes the case of the data being streamed for inclusion in the packet being queued in the host memory of the station for later transmission.

During receive time means at the time the packet is being received, e.g., in the case there is only one MAC processor, prior to the next received packet is processed at the MAC level by the MAC processor.

One embodiment of each of the methods described herein is in the form of a set of instructions that instruct a machine implement a method. Thus, as will be appreciated by those skilled in the art, embodiments of the present invention may be embodied as a method, an apparatus such as a special purpose apparatus, an apparatus such as a data processing system, or a carrier medium, e.g., a computer program product. The carrier medium carries one or more computer readable code segments for controlling a processor of a processing system to implement a method. Accordingly, aspects of the present invention may take the form of a method, an entirely hardware embodiment, an entirely software embodiment or an embodiment combining software and hardware aspects. Furthermore, the present invention may take the form of carrier medium (e.g., a computer program product on a computer-readable storage medium) carrying computer-readable program code segments embodied in the medium. Any suitable computer readable medium may be used including memory.

It will be understood that the steps of methods discussed are performed in one embodiment by an appropriate processor (or processors) of a processing (i.e., computer) system executing instructions (code segments) stored in storage. It will also be understood that the invention is not limited to any particular implementation or programming technique and that the invention may be implemented using any appropriate techniques for implementing the functionality described herein. The invention is not limited to any particular programming language or operating system.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner, as would be apparent to one of ordinary skill in the art from this disclosure, in one or more embodiments.

Similarly, it should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

It should further be appreciated that although the invention has been described in the context of a network switch coupled to an access point, the invention is not limited to such contexts and may be utilized in various other applications and systems, for example in a system that includes any wireless station coupled to any network device via a network link. Furthermore, the invention is not limited to any one type of network architecture and method of encapsulation, and thus may be utilized in conjunction with one or a combination of other network architectures/protocols.

Note that the inventors found that for the presently available IEEE 802.11 standards, an Ethernet that is at least as fast as a Gigabit Ethernet provides the required latency time. The invention, however, is not restricted to using an Ethernet for the link between the station and the network device, and also for using a Gigabit Ethernet or faster link. For example, a wireless network protocol may be used that is slow enough such that a 100 MB Ethernet link may be used. Also, faster wireless protocols may be introduced that require a link of at least a 10 GB Ethernet. All these are meant to be included in the scope of the invention.

All publications, patents, and patent applications cited herein are hereby incorporated by reference.

Thus, while there has been described what is believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

What is claimed is:

1. In a station of a wireless network, the station coupled to a network device by a network link, the network device including a memory, a method of streaming data over the network link from or to the network device memory during wirelessly transmitting or wirelessly receiving at the station, the method comprising:

accepting information describing wherefrom to retrieve a data element including at least some of the data for a to-be-wirelessly-transmitted packet in the case of transmitting, or whereto write a data element including at least some of the data from a wirelessly received packet in the case of receiving, the accepted information including information defining a memory location and an amount data in the network device memory for said data element;

setting up a DMA transfer of said data element for the to-be-wirelessly-transmitted packet in the case of transmitting, or from the wirelessly received packet in the case of receiving, the setting up using the defining information; and in the case of transmitting:
converting the defining information to a packet of a first type for transport over the network link;
sending the packet of the first type via the network link to the network device to be interpreted at the network device to set up sending said data element from the memory of the network device according to the defining information;
receiving in response to the sending of the packet of the first type, a packet of a second type that includes said data element;
converting the packet of the second type to said data element; and
incorporating said data element into the packet for transmission, or, in the case of receiving:
extracting said data element from the wirelessly received packet;
converting the defining information and encapsulating said data element into a packet of the second type for transport over the network link for said data element to be written into the memory of the network device; and
sending the packet of a second type to the network device to be interpreted at the network device to cause the encapsulated data to be written into the memory of the network device according to the defining information, such that, in the case of transmitting, the transfer over the network link of said data element for incorporation into a packet for wireless transmission occurs in real time during transmit time, or such that in the case of receiving, the transfer of said data element from a wirelessly received packet occurs in real time during receive time.

2. A method as recited in claim 1, wherein the station is an access point of the wireless network.

3. A method as recited in claim 1, wherein the wireless network conforms to one of the IEEE 802.11 standards or derivatives thereof.

4. A method as recited in claim 3, wherein the packet is an 802.11 MAC packet.

5. A method as recited in claim 1, wherein the network device is a network switch that includes a memory wherefrom data is streamed during the wireless transmitting or whereto data is streamed during the wireless receiving.

6. A method as recited in claim 5, wherein the network link is a Gigabit Ethernet link or an Ethernet link at least as fast as a Gigabit Ethernet link.

7. A method as recited in claim 1, wherein setting up of the DMA transfer is part of a setup of a scatter/gather DMA transfer of a plurality of data elements.

8. In a network device coupled by a network link to a wireless station of a wireless network, the network device including a memory, a method of streaming data over the network link from or to the network device memory during wirelessly transmitting or during wirelessly receiving at the station, the method comprising:

sending information over the network link to the wireless station describing wherefrom to retrieve a data element including at least some of the data for a to-be-wirelessly-transmitted packet in the case of transmitting, or whereto write a data element including at least some of the data from a wirelessly received packet in the case of receiving, the accepted information including information defining a memory location and an amount data in the network device memory for said data element; and in the case of data for a to-be-transmitted packet:
receiving from the wireless station via the network link a packet of the first type, the packet of the first type including information describing wherefrom to retrieve said data element;
retrieving said data element from the memory, the retrieving in response to the receiving of a packet of a first type;
forming a packet of a second type that includes the retrieved data; and
sending the packet of a second type to the wireless station in response to the receiving, or, in the case of data from a received packet:
receiving a packet of a second type from the wireless station encapsulating said data element and including information describing whereto write said data element;
extracting the encapsulated data from the packet of the second type;
writing the extracted data into the memory according to information in the received packet of the second type, such that, in the case of transmitting, the transfer of data over the network link for incorporation into a packet for wireless transmission occurs in real time during transmit time, or such that in the case of receiving, the transfer of data over the network link from a wirelessly received packet occurs in real time during receive time.

9. A method as recited in claim 8, wherein the station is an access point of the wireless network.

10. A method as recited in claim 8, wherein the wireless network conforms to one of the IEEE 802.11 standards or derivatives thereof.

11. A method as recited in claim 10, wherein the packet is an 802.11 MAC packet.

12. A method as recited in claim 8, wherein the network device is a network switch.

13. A method as recited in claim 12, wherein the network link is a Gigabit Ethernet link or an Ethernet link at least as fast as a Gigabit Ethernet link.

14. A method as recited in claim 8,
wherein the information wherefrom to retrieve a data element or whereto write a data element is used in setting up a DMA transfer, and
wherein setting up of the DMA transfer is part of a setup of a scatter/gather DMA transfer of a plurality of data elements.

15. An apparatus in a wireless station operable in a wireless network, the apparatus comprising:
a local memory able to receive information describing a location wherefrom a data element including at least some of the data for a to-be-wirelessly transmitted packet is to be obtained, the location being in a memory of a network device coupled by a network link to the wireless station;
a packet/DMA engine coupled to the local memory, the packet DMA engine able to set up a DMA transfer of data for the to-be-wirelessly-transmitted packet, the setting up using the received information in the memory and forming information defining a set of at least one location in the memory of the network device; and
a network interface coupled to the packet/DMA engine, the network interface including a network DMA engine able to accept DMA requests for transfer of data, the network DMA engine able to convert defining information to a packet of a first type and to cause the network interface to send the packet of the first type over a network link to which the network interface is coupled, such that a compatible network device can interpret and retrieve the data defined by the defining information, the network interface further able to recognize and provide the network DMA engine a packet of a second type received over the network link, the packet of the second type including data defined by defining information, the network DMA engine further able to convert the provided packet of the second type to data included therein,
such that, in the case that the station is coupled to a first network, and a first packet of the second type is received over the first network from a first network device also coupled to the first network, said receiving of the first packet of the second type being in response to the sending of a first packet of the first type and said sending of the first packet is as a result of the network DMA engine accepting a first DMA request that defines data to be retrieved from a memory of the first network device, the network DMA engine responds to the first DMA request with the data defined in the first DMA request, and
such that the transfer of data over the first network for incorporation into a packet for wireless transmission can occur in real time during transmit time.

16. An apparatus as recited in claim 15,
wherein the local memory is further able to receive information describing a location to where an element of data from a wirelessly received packet is to be stored, the location in the memory of the network device coupled by the network link to the wireless station,
wherein the packet/DMA engine using the received information in the local memory is further able to set up a DMA transfer of a data element including at least some of the contents of the wirelessly received packet,
wherein the network DMA engine is further able to form a packet of a second type including the data element defined by defining information in a DMA request accepted by the network DMA engine, and
wherein the network interface is further able to send the formed packet of the second type,
such that, in the case that the station is coupled to the first network and the first network device is also coupled to the first network, a second packet of the second type is sent over the first network to the first network device as a result of the network DMA engine accepting a second DMA request that defines data to be sent to the memory of the first network device, and
such that the transfer of data over the network link from a wirelessly received packet occurs in real time during receive time.

17. An apparatus as recited in claim 15, the apparatus further comprising:
a host processor coupled to a host bus subsystem; and
a host DMA controller coupled to the host subsystem,
wherein the packet/DMA engine is also coupled to the host bus subsystem and able to communicate to the host DMA controller,
such that the packet DMA engine's setting up a DMA transfer includes the packet DMA engine instructing the host DMA controller to set up the DMA transfer, and
such that the network DMA engine appears to the host DMA controller as a memory interface,
wherein the local memory is further able to receive information describing a location to where an element of data from a wirelessly received packet is to be stored, the location in the memory of the network device coupled by the network link to the wireless station,
wherein the packet/DMA engine using the received information in the local memory is further able to set up a DMA transfer of a data element including at least some of the contents of the wirelessly received packet,
wherein the network DMA engine is further able to form a packet of a second type including the data element defined by defining information in a DMA request, and
wherein the network interface is further able to send the formed packet of the second type.

18. An apparatus as recited in claim 17, wherein the packet/DMA engine includes a scatter/gather DMA controller to set up the transfer of a plurality of data elements.

19. An apparatus as recited in claim 15, wherein the station is an access point of the wireless network.

20. An apparatus as recited in claim 15, wherein the wireless network conforms to one of the IEEE 802.11 standards or derivatives thereof.

21. An apparatus as recited in claim 20, wherein the to-be-wirelessly transmitted packet is an 802.11 MAC packet.

22. An apparatus as recited in claim 15, wherein the network device is a network switch that includes a memory wherefrom data is streamed during the wireless transmitting.

23. An apparatus as recited in claim 22, wherein the network link is a Gigabit Ethernet link or an Ethernet link at least as fast as a Gigabit Ethernet link.

24. A method of wirelessly transmitting a packet of information, the method comprising:
   streaming a data element including at least some of the contents of the packet over a network link during transmit time; and
   transmitting the packet of information,
wherein the transmitting is by a station of a wireless network and the streaming is to the station from a network device coupled to the station by the network link, and
wherein the network device includes a memory wherefrom data is streamed during the wireless transmitting, the method further comprising:
   forming a DMA request for said data element;
   converting the formed DMA request to a first packet for transport over the network link;
   sending the first packet to the network device over the network link;
   receiving a second packet over the network link from the network device, said second packet containing said data element; and
   responding to the formed DMA request with said data element from the second packet,
such that the streaming of said data element of the data uses the second packet.

25. A method as recited in claim 24, wherein the station is an access point of the wireless network.

26. A method as recited in claim 24, wherein the wireless network conforms to one of the IEEE 802.11 standards or derivatives thereof.

27. A method as recited in claim 26, wherein the packet is an 802.11 MAC packet.

28. A method as recited in claim 24, wherein the network device is a network switch that includes a memory wherefrom data is streamed during the wireless transmitting.

29. A method as recited in claim 28, wherein the network link is a Gigabit Ethernet link or an Ethernet link at least as fast as a Gigabit Ethernet link.

30. A method as recited in claim 24, further comprising:
   receiving from the network device information regarding where data for wireless transmission resides in the memory of the network device,
such that the forming of the DMA request uses the received information.

31. A method as recited in claim 24, wherein the network link is a Gigabit Ethernet link or an Ethernet link at least as fast as a Gigabit Ethernet link, and wherein the network device is a network switch, wherein the wireless network is a network conforming to one of the IEEE 802.11 standards or a derivative thereof, and wherein the first and second packets are respectively Ethernet packets of a first type and a second type.

32. A method of wirelessly receiving a packet of information, the method comprising:
   wirelessly receiving a packet of information; and
   streaming a data element including at least some of the contents of the packet over a network link during receive time,
wherein the receiving is by a station of a wireless network and the streaming is from the station to a network device coupled to the station by the network link, and
wherein the network device includes a memory whereto data is streamed during the wireless transmitting, the method further comprising:
   forming a DMA request for writing said data element;
   converting the formed DMA request to a first packet for transport over the network link;
   sending the first packet to the network device over the network link;
   encapsulating said data element into a second packet for transport over the network link to the network device; and
   sending the second packet over the network link to the network device for writing into the memory of the network device according to the formed DMA instruction,
such that the streaming of said data element of the data uses the second packet.

33. A method as recited in claim 32, wherein the station is an access point of the wireless network.

34. A method as recited in claim 32, wherein the wireless network conforms to one of the IEEE 802.11 standards or derivatives thereof.

35. A method as recited in claim 34, wherein the packet is an 802.11 MAC packet.

36. A method as recited in claim 32, wherein the network device is a network switch that includes a memory whereto data is streamed during the wireless receiving.

37. A method as recited in claim 36, wherein the network link is a Gigabit Ethernet link or an Ethernet link at least as fast as a Gigabit Ethernet link.

38. A method as recited in claim 32, further comprising:
   receiving from the network device information regarding where wirelessly received data is to be written in the memory of the network device,
such that the forming of the DMA request uses the received information.

39. A method as recited in claim 32, wherein the network link is a Gigabit Ethernet link or an Ethernet link at least as fast as a Gigabit Ethernet link, and wherein the network device is a network switch, and wherein the wireless network is a network conforming to one of the IEEE 802.11 standards or a derivative thereof, and wherein the first and second packets are respectively Ethernet packets of a first type and a second type.

40. An apparatus to wirelessly transmit a packet of information, the apparatus including:
   means for wirelessly transmitting a packet of information; and
   means for streaming a data element, including at least some of the contents of the packet, over a network link during transmit time,
wherein the means for transmitting is in a station of a wireless network,
   wherein the means for streaming is for streaming from a network device coupled to the wireless station by the network link, and
wherein the network device includes a memory wherefrom data is streamed during the wireless transmitting, the apparatus further comprising:
   means for forming a DMA request for said data element;
   means for converting the formed DMA request to a first packet for transport over the network link;
   means for sending the first packet to the network device over the network link;
   means for receiving a second packet over the network link from the network device, said second packet containing said data element; and means for responding to the formed DMA request with said data element from the second packet, such that the means for streaming of said data element of the data uses the second packet.

41. A carrier medium carrying a set of machine readable instructions to instruct a machine to carry out a method of wirelessly transmitting a packet of information, the method including:

streaming a data element, including at least some of the contents of the packet, over a network link during transmit time; and transmitting the packet of information, wherein the transmitting is in a station of a wireless network, wherein the streaming is from a network device coupled to the wireless station by the network link, and wherein the network device includes a memory whereto data is streamed during the wireless transmitting, the method further comprising:

forming a DMA request for writing said data element and encryption information;

converting the formed DMA request and the encryption information to a first packet for transport over the network link;

sending the first packet to the network device over the network link;

encapsulating said data element encrypted according to the encryption information into a second packet for transport over the network link to the network device; and sending the second packet over the network link to the network device for writing into the memory of the network device according to the formed DMA request, such that the streaming of said data element of the data uses the second packet.

42. An apparatus to wirelessly receive a packet of information, the apparatus including:

means for wirelessly receiving a packet of information; and means for streaming a data element, including at least some of the contents of the received packet, over a network link during transmit time, wherein the receiving is in a station of a wireless network, wherein the streaming is to a network device coupled to the wireless station by the network link, and wherein the network device includes a memory whereto data is streamed during the wireless transmitting, the apparatus further comprising:

means for forming a DMA request for writing said data element;

means for converting the formed DMA request to a first packet for transport over the network link;

means for sending the first packet to the network device over the network link;

means for encapsulating said data element into a second packet for transport over the network link to the network device; and means for sending the second packet over the network link to the network device for writing into the memory of the network device according to the formed DMA instruction, such that the means for streaming of said data element of the data uses the second packet.

43. A carrier medium carrying a set of machine readable instructions to instruct a machine to carry out a method of wirelessly receiving a packet of information, the method including:

streaming a data element, including at least some of the contents of the received packet, over a network link during transmit time, wherein the receiving is in a station of a wireless network, wherein the streaming is to a network device coupled to the wireless station by the network link, and wherein the network device includes a memory whereto data is streamed during the wireless transmitting, the method further comprising:

forming a DMA request for writing said data element;

converting the formed DMA request to a first packet for transport over the network link;

sending the first packet to the network device over the network link;

encapsulating said data element into a second packet for transport over the network link to the network device; and sending the second packet over the network link to the network device for writing into the memory of the network device according to the formed DMA instruction, such that the streaming of said data element of the data uses the second packet.

* * * * *

UNITED STATES PATENT AND TRADEMARK OFFICE
CERTIFICATE OF CORRECTION

PATENT NO. : 6,954,450 B2 Page 1 of 1
APPLICATION NO. : 10/724559
DATED : October 11, 2005
INVENTOR(S) : Krischer et al.

It is certified that error appears in the above-identified patent and that said Letters Patent is hereby corrected as shown below:

In col. 18, line 2, change "wireless transmitting" to --wirelessly receiving--.

In col. 19, line 43, change "transmit time" to --receive time--.

In col. 19, line 48, change "wireless transmitting" to --wirelessly receiving--.

In col. 20, line 25, change "transmit time" to --receive time--.

In col. 20, line 30, change "wireless transmitting" to --wirelessly receiving--.

Signed and Sealed this

Fourteenth Day of April, 2009

JOHN DOLL
*Acting Director of the United States Patent and Trademark Office*